United States Patent Office 3,434,996
Patented Mar. 25, 1969

3,434,996
POLYTETRAFLUOROETHYLENE EXTRUSION
COMPOSITIONS AND EXTRUSION PROCESS
Peter P. Salatiello, Morris Plains, and Stephen C. Dollman, Succasunna, N.J., assignors to Allied Chemical Corporation, New York, N.Y., a corporation of New York
No Drawing. Filed July 10, 1967, Ser. No. 651,993
Int. Cl. C08f 45/30; C08g 51/30
U.S. Cl. 260—33.8                                           30 Claims

ABSTRACT OF THE DISCLOSURE

Disclosed are extrusion compositions comprising granular polytetrafluoroethylene and perhalogenated ethanes containing only fluorine and chlorine as halogen, and containing at least one, but not more than three fluorine atoms, and processes for extrusion fabrication of polytetrafluoroethylene utilizing these extrusion compositions.

Polytetrafluoroethylene resin, hereinafter referred to as PTFE, has excellent thermal, chemical dielectric, frictional, and mechanical properties. For these reasons it has found many applications, as for example in the manufacture of gaskets, valve packings, seals, unlubricated bearings, electrical insulators, and non-stick coatings, to mention but a few. A major impediment to its use is the difficulty of its fabrication. Although classified as a thermoplastic resin, PTFE, does not melt and flow as do other resins of this type, and customary methods of fabricating thermoplastic materials, such as injection molding and melt extrusion, cannot be applied to PTFE. Methods for fabrication of solid articles from PTFE in finely divided form, as obtained by the polymerization of tetrafluoroethylene, generally follow methods commonly employed in powder metallurgy, and involve cold forming operations followed by sintering at temperatures in excess of about 327° C.

Depending on polymerization conditions, PTFE is produced in two distinctly different forms: (1) granular powders, which are resins comprising rough sponge-like PTFE particles of supercolloidal dimensions having a total surface area of from about 1 to 4 square meters per gram, corresponding to a theoretical average ultimate particle dimension of about 0.67 to 2.67μ based on the assumption that all particles are spherical, as determined by nitrogen absorption by the method described in Barr and Anhorn, Scientific and Industrial Glassblowing and Laboratory Techniques, Instruments Publishing Comp. (1949), Chapter XII; and (2) dispersions, fine powders, or granular agglomerates in which the ultimate particle size is in the order of 0.1μ. Hereinafter the former shall be referred to as granular PTFE, and the latter as colloidal size PTFE.

Granular PTFE may be produced by polymerization of the gaseous monomer under pressure in an aqueous solution containing a catalyst in the absence of organic additives.

Granular powders of PTFE, also known to the art as molding powders, are suitable for forming solid shapes of PTFE by molding and certain types of extrusion processes. In processes for extrusion of granular PTFE it has heretofore not been possible to successfully achieve high extrusion rates and high reduction ratios at room temperature under moderately high extrusion pressures. Satisfactory results are generally achieved only when extrusion is carried out at temperatures above 327° C. and when no reduction in cross-sectional area is involved, i.e. when using an extrusion die having an orifice area equal to the cross-sectional area of the feed barrel of the extruder.

Fine powders and granular agglomerates of colloidal size PTFE may be obtained by coagulation of aqueous colloidal dispersions of PTFE. Aqueous colloidal dispersions and methods for their preparation are disclosed in U.S.P. 2,478,229 to Berry.

Colloidal size PTFE may be lubricated with various lubricants, and the resulting dry powder or paste may then be extruded under pressure through a die having the size and shape of the desired article. The lubricant is removed from the resulting extrudate by either volatilization or solvent extraction, and the extrudate is then heated to a temperature about 327° C. to sinter the polymer into the finished article. Lubricated compositions comprising colloidal size PTFE may be extruded at good production rates using moderate extrusion pressures. A variety of organic compounds are suitable for use as lubricants in lubricated extrusion compositions comprising colloidal size PTFE. These include aliphatic, cycloaliphatic and aromatic hydrocarbons, petrolatum, low melting waxes, nuclear chlorinated aromatic compounds, chlorinated paraffins, fluorinated hydrocarbon oils, alcohols, ethers, esters, amines, ketones, as well as silicone oils (polyorgano siloxanes). A lubricant commonly used in extrusion compositions comprising colloidal size PTFE is "Deo-Base" (T.M.), a highly refined deodorized form of kerosene. However, it is well known to the art that when these lubricants are mixed with granular PTFE powder in the manner and proportions in which they are commonly mixed with colloidal size PTFE powders, the resulting compositions cannot readily be extruded to yield satisfactory articles. Mixtures of granular PTFE and the lubricants of the prior art extrude into shreds with no continuity, and the lubricant exudes from the granular polymer mixture upon application of slight pressure.

It is known to plasticize PTFE to improve its fabrication characteristics. Plasticization may, for example, be accomplished by treatment of the solid PTFE with oils, greases and waxes obtained by the polymerization of chlorotrifluoroethylene, with fluorocarbon oils, or with various halogenated hydrocarbons. Known plasticization treatments involve heating a mixture of the PTFE with a plasticizer, or conducting the polymerization in the presence of a plasticizer. In both cases the plasticizer is incorporated in the polymer. While the PTFE so plasticized is readily extruded, such result is achieved at a substantial penalty in that plasticization causes irreversible loss of mechanical properties of the resin. The plasticized material is softer and more flexible than the untreated polymer, and softens at lower temperatures, which severely limits its utility for many applications.

Since articles produced from granular PTFE have higher mechanical strength than those produced from colloidal size PTFE, and since granular PTFE is cheaper than colloidal size PTFE, there exists an obvious need for processing allowing extrusion fabrication of granular PTFE under conditions comparable to those now attainable in extrusion processes employing lubricated extrusion compositions comprising colloidal size PTFE.

It is a principal object of this invention to provide extrusion compositions comprising granular PTFE and certain perhalogenated ethane lubricants.

It is another object of this invention to provide a method for lubricated extrusion fabrication of granular PTFE into shaped articles.

It is a further object of this invention to provide extrusion compositions comprising granular PTFE and certain perhalogenated ethane lubricants which can be extruded at high extrusion rates and high reduction ratios under moderate extrusion pressures.

Other objects and advantages of the present invention will become apparent from the following description.

These objects of the invention are achieved by the provision of (1) extrusion compositions comprising between 50 percent and 95 percent by weight of granular PTFE and between 5 percent and 50 percent by weight of specific fluoro-chlorinated ethanes, and (2) certain hereinafter described methods for extrusion fabrication of said extrusion compositions.

We have discovered that compositions comprising granular PTFE powders of small particle size and certain perhalogenated ethanes can be extruded at rates, reduction ratios, temperatures and extrusion pressures comparable to those used when extruding lubricated extrusion compositions comprising colloidal size PTFE powders and known extrusion lubricants therefor.

Granular PTFE powders of small particle size suitable for use in the extrusion compositions and processes of this invention are the mechanically subdivided products of the polymerization of the gaseous tetrafluoroethylene monomer in an aqueous medium having dissolved therein a catalyst, as e.g., described in U.S.P. 2,393,967 to Brubaker. Granular PTFE powders having a wet sieve particle size of up to about 210μ are suitable for use in the extrusion composition and processes of this invention; granular PTFE powders having a mean particle size of up to about 50μ as determined by "Coulter Counter" (T.M.) method are preferred. There is no theoretical lower particle size limit on the granular PTFE powders suitable for use in the practice of the present invention other than the requirement that these PTFE powders are granular PTFE, as distinguished from colloidal size PTFE, also known to the art as paste PTFE. In practice, however, it is exceedingly difficult to mechanically subdivide granular PTFE to a mean particle size below about 5μ, as determined by "Coulter Counter" (T.M.).

Wet sieve particle size as herein defined is the measured particle diameter obtained by washing the particles through a wire mesh screen of known mesh size. The wire mesh screen used for making the determination is the U.S. Standard Sieve 70 mesh (210μ). The wet sieve particle size determination is made by washing a sample of the granular PTFE through the wire mesh screen by spraying with perchloroethylene for about 1 minute at a rate of 3 liters per minute using a shower spray.

The "Coulter Counter" (T.M.) provides a method for the determination of particle size in the 1 to 100μ range, which is based on the principle of changes in the electrical conductance of an electrolyte solution, containing suspended therein the particles the size of which is to be determined, as the solution and suspended particles pass through a small orifice. "Coulter Counters" (T.M.) are commercially available instruments.

PTFE granular powders obtained by direct polymerization of the gaseous monomer may be mechanically subdivided in a suitable milling device, as for example a hammermill or an airmill, to obtain granular powders of a particle size suitable for use in the extrusion composition and processes of this invention.

Also suitable for use in the compositions and processes of this invention are the granular copolymers of tetrafluoroethylene with hexafluoropropylene or chlorotrifluoroethylene, containing a minimum of about 90 percent by weight of the tetrafluoroethylene component, and mixtures of these copolymers with each other and with granular PTFE. Copolymers of tetrafluoroethylene with hexafluoropropylene or chlorotrifluoroethylene, containing less than about 90 percent by weight of the tetrafluoroethylene component, generally soften at higher temperatures and are melt extrudable.

The lubricants suitable for use in the extrusion compositions and processes of this invention are the perhalogenated ethanes containing only fluorine and chlorine atoms as the halogen, and containing at least one, but not more than 3 fluorine atoms. These lubricants are pentachloromonofluoroethane, 1,2-difluorotetrachloroethane, 1,1-difluorotetrachloroethane, 1,1,2-trichlorotrifluoroethane, 1,1,1-trichlorotrifluoroethane, and mixtures of two or more of these compounds. Pentachloromonofluoroethane, 1,2 - difluorotetrachloroethane, 1,1,1 - trichlorotrifluoroethane, and mixtures thereof, are preferred lubricants. It has been found that close analogues of the lubricants listed above are not suitable for use in the extrusion compositions of this invention. So, for instance, extrusion mixtures comprising hexachloroethane do not yield a continuous extrudate, but extrude into shreds with no continuity. The same observation was made when using fluorochlorinated ethanes containing one or more hydrogen atoms, or fluorinated or chlorinated ethanes carrying one or more hydrogen atoms, or halogenated ethanes carrying bromine atoms in addition to fluorine or chlorine atoms or fluorine and chlorine atoms. We cannot explain why some halogenated ethanes are effective lubricants while close analogues are unsuitable.

The extrusion compositions of this invention may contain the lubricant in an amount equal to from about 5 to about 50 percent, preferably about 5 to about 25 percent of the combined weight of the polymer and the lubricant. Compositions comprising about 15 to about 25 percent by weight of the lubricant are preferred for use in extrusion processes employing extrusion temperatures in the range of from about room temperature, about 20° C., to about 50° C. Lower lubricant concentrations ranging between about 5 and about 15 percent of the combined weight of lubricant and resin are preferably employed in extrusion processes wherein the extrusion temperatures range between about 60° C. and about 120° C. The extrusion temperature, as herein defined, is the temperature of the extrusion composition in the feed barrel of the extruder, without regard to the temperature of the extrudate as it leaves the orifice of the extrusion die. The latter temperature, due to working and deformation of the extrusion composition in the die, is higher than the extrusion temperature as herein defined.

Lubricant concentrations in excess of about 50 percent of the combined weight of the lubricant and the resin may be employed, but with increasing lubricant concentrations the strength of the unsintered extrudate decreases, and the extrudate tends to become soft and pasty, hence difficult to handle. For this reason and for the further reason that with increasing lubricant concentration shrinkage of the extrudate due to evaporation of the lubricant also increases, it is preferred to use the minimum amount of lubricant that provides a readily extrudable composition.

The extrusion compositions of this invention may be produced by simply blending the granular PTFE powder and the liquid lubricant, for example, as by spraying the lubricant onto the powder while the powder is being mixed in a suitable commercial mixer of which there are several types; by merely pouring the lubricant onto a mass of granular PTFE powder and then blending the mix; or by other means known to the art. The object of the blending operation is to insure uniform, intimate mixing of the components. The lubricants suitable for use in the extrusion compositions of this invention are readily blended into a suitably uniform mix with the granular PTFE powder.

We have found that the manner in which the components comprising the extrusion compositions are mixed has no influence on their extrusion characteristics, provided the components are uniformly blended. The extrusion compositions of this invention may be extruded immediately after compounding. Aging of these compositions, either at room temperature or at elevated temperatures has no effect on their extrusion characteristics.

The extrusion compositions of this invention readily extrude into strong continuous extrudates at rates, reduction ratios and extrusion pressures comparable to those obtainable with lubricated extrusion compositions comprising colloidal size PTFE.

The extrusion pressure is the pressure exerted upon the extrusion composition in the feed barrel of the extruder.

The reduction ratio, as used herein, is defined as the ratio of the cross-sectional area of the extruder barrel to the cross-sectional area of the die orifice.

When extruding the extrusion compositions of this invention at a reduction ratio of about 40:1, using a die having a 5 millimeter orifice, a ¼ in. land, and a 60° straight taper in a ram extrusion press having a barrel of 1¼ in. diameter and a ram travel of 1 in. per minute, extrusion pressures of from about 3,000 p.s.i.g. to about 18,000 p.s.i.g. are required. Higher reduction ratios up to about 200:1 may be attained under similar conditions, but such higher reduction ratios require higher extrusion pressures. So, for instance, reduction ratios of about 100:1 require extrusion pressures ranging up to about 25,000 p.s.i.g. Other conditions being equal, reduction ratios lower than about 40:1 require correspondingly lower extrusion pressures. We have not been able to extrude unlubricated granular PTFE at reduction ratios of 40:1 at pressures below about 30,000 p.s.i.g. Low extrusion pressures are of course highly desirable because they allow the use of less rigidly constructed, hence less costly extruders and, in an extruder of given capacity, lower extrusion pressures allow extrusion of articles having a larger cross-sectional area.

In the processes of our invention extrusion temperatures, as herein defined, may range between about 10° C. to about 200° C. Other conditions being equal, extrusion pressures decrease with increasing extrusion temperatures. Preferred extrusion temperatures range between about room temperature, say 20° C., and about 150° C. Extrusion temperatures lower than about room temperature may be employed, but offer no apparent advantage. Extrusion temperatures above about 150° C. may also be employed, but due to the rapid evaporation of the perhalogenated ethane lubricants from the extrudate at these higher temperatures, there is danger of fracturing the extrudate.

The extrusion compositions of this invention may be extruded in ram type or screw type extruders. Methods of feeding the extrusion composition to the extruder are conventional. For ease of feeding, the extrusion compositions of this invention may be preformed, as for example by compaction under low pressure (say about 5 to 50 p.s.i.g.) to form a billet for easy insertion into the barrel of a ram type extruder, or by pelletizing or granulating the compositions to allow their continuous feed at constant feed rate to a screw type extruder. Care should be taken that in the preform step the lubricant concentration is not reduced by evaporation to too low a level. If the particular preform procedure employed involves a loss of lubricant, such loss may be compensated for by providing an initial excess of the lubricant.

The extrudates resulting from the extrusion of the compositions of this invention have high unsintered strength, and are highly fibrillated. During the extrusion process the individual particles of the granular PTFE, which before undergoing extrusion are of odd, somewhat rounded shape, are deformed into fibers, which fibers are tightly bundled and are arranged in the direction of extrusion. Fibrillation is characteristically found in extrudates of the extrusion of lubricated compositions of colloidal size PTFE.

The lubricant may be removed from the extrudate by heating the latter to evaporate the lubricant therefrom. Suitable evaporation temperatures range between about room temperature, say 20° C., and the sintering temperature of the resin. After removal of the lubricant the extrudate may be sintered in conventional manner by heating it to a temperature above 327° C.

The sintered products produced in accordance with the teachings of this invention have the excellent mechanical properties typical of articles fabricated from granular PTFE resin. Tensile strength of the extruded and sintered products ranges between about 3000 lbs./sq. in. and about 5000 lbs./sq. in. as compared to tensile strengths between about 2000 lbs./sq. in. and about 3000 lbs./sq. in. obtainable in sintered products obtained by known processes of lubricated extrusion of colloidal size PTFE. The tensile strength, as used herein, is the value determined per ASTM test number D 638.

The compositions and the processes of this invention permit the extrusion of thin, flexible sections, and are especially suited for extrusion fabrication of such articles as, e.g., thin rods, thin walled tubing, tape, and wire insulation. The solid unsintered extrudates prepared according to the present invention can be mechanically milled to yield fluffy fibrous products comprised of particulate fibers. So, for instance, mechanical subdivision of unsintered extrudates in a conventional pin mill, hammer mill, or knife-edged blender yields coarse fibers of about ½ to about 1½ in. in length, and a length to diameter ratio of about 10:1 to about 15:1. By further attrition milling of the coarse fibers, as, e.g., by use of an airmill, fine fibers of about 100μ to about 1000μ length, and having the same length to diameter ratio as the coarse fibers from which they are prepared, may be obtained. These fibrous products are valuable raw materials for fabrication of a number of products, as, e.g., gaskets, bearing linings, filter membranes, and valve packings.

The following examples are given to further illustrate the present invention. In these examples, the granular PTFE having a mean particle size between about 25μ and about 35μ was a product commercially sold under the trademark "Halon G-80."

EXAMPLE I

To 100 grams of granular PTFE having a mean particle size of about between 25μ and about 35μ contained in a wide necked jar were added 23 grams of sym.-difluorotetrachloroethane. The mixture was hand tumbled to blend liquid and solid components. The mixture so blended was then hand compacted in a cylindrical tube having a 1¼ in. diameter to form a cylindrical billet. The billet so formed was inserted into the barrel of a ram type extruder having a barrel diameter of 1¼ in. and a barrel length of 16 in. The extruder was equipped with a die having a 5 millimeter diameter circular orifice, a ¼ in. land, and a 60° straight taper. The extrusion ram was inserted into the barrel to rest on the billet and pressure was applied to the ram to move the ram against the billet at a predetermined rate of 1 in. per minute. A continuous record was kept of the ram pressure throughout the extrusion process by use of an automatic pressure recorder. The pressure initially built up to about 9,500 p.s.i.g., and the extrusion composition began to extrude in a continuous strand having a glazed surface. After the strand had reached a length of about 30 in. the ram pressure dropped to 6,370 p.s.i.g., and a partial discontinuity having a frayed appearance was observed on the strand. The pressure then again built up to about 8,000 p.s.i.g., and an additional 8 in. of strand were extruded without further surface defects. The extrudate was strong, could be handled without breaking, and was highly fibrillated. Pressures during the extrusion run varied between a minimum pressure of 6,370 p.s.i.g. and a maximum pressure of 9,500 p.s.i.g.

A short piece of the extruded strand was air dried at room temperature for a period of about 6 hours to evaporate the sym.-difluorotetrachloroethane lubricant, and thereafter was sintered at a temperature of 380° C. for a period of 2 hours. The sintered product was a solid rod having a smooth surface and a 3/16 in. diameter.

A 50 gram portion of the unsintered strand was milled in a laboratory "Waring" (T.M.) blender for a period of a few minutes. The resulting product was a fibrous mass comprised of fibers having a length predominantly between ½ in. and 1½ in., and length to diameter ratio of between about 10:1 and about 15:1.

Various extrustion compositions were prepared and extruded in the manner described in Example 1. To facilitate comparison of the results obtained, in the following examples the quality of the extrudate is expressed as a numerical extrusion rating corresponding to the numbers 1 through 10.

| Extrusion rating | Appearance of Extrudate |
|---|---|
| 1 | Extrudate continuous over entire length, no visible surface irregularities, cannot be pulled apart under moderate longitudinal tension. |
| 2 | Extrudate continuous over entire length, not more than 1 "fray," and/or minor "fish scales." |
| 3 | Extrudate continuous over entire length, not more than 2 "frays," and/or bad "fish scales." |
| 4 | Extrudate in two pieces which individually cannot be pulled apart under moderate longitudinal tension, and bad "fish scales." |
| 5 | Extrudate in two pieces which individually cannot be pulled apart under moderate longitudinal tension, plus slight "frays" that cannot be pulled apart under moderate longitudinal tension. |
| 6 | Extrudate in 2 pieces which individually can be pulled apart under moderate longitudinal tension into 3 or 4 pieces, or two pieces with a total of 3 or 4 "frays." |
| 7 | Extrudate in two pieces which individually can be pulled apart under moderate longitudinal tension to form a total of 5 to 6 pieces, or 2 pieces with a total of 5 to 6 "frays." |
| 8 | Extrudate in two pieces which individually can be pulled apart under moderate longitudinal tension to form a total of 7 or more pieces, or 2 pieces with a total of 7 or more "frays." |
| 9 | Extrudate discontinuous pieces 2 to 6 in. long. |
| 10 | Extrudate discontinuous pieces less than 2 in. long. |

As used in these ratings, a "fray" is a partial discontinuity of the extrudate, having the appearance of a diagonal cut into and through at least ½ of the diameter of the extrudate. A "fish scale" is a partial discontinuity in the surface fibers of the extrudate which, upon bending of the extrudate, allows a small surface section of the extrudate to lift away from the main body thereof. A "fish scale," essentially, is a tiny surface "fray".

Examples 2 to 27 employ those lubricants found to be useful in the compositions and process of the present invention.

EXAMPLES 2 to 11

The PTFE granular powder used in these examples had a mean particle size of between 25μ and 35μ, the extrusion compositions contained 19 percent by weight of the lubricant, and the extrusion compositions were extruded at a reduction ratio of 40:1 using a ram travel of 1 in./min. at various extrusion temperatures. Lubricants, extrusion pressures and temperatures, and extrusion ratings are listed below in Table I.

TABLE I

| Example | Lubricant | Extrusion pressure, p.s.i.g. Min. | Extrusion pressure, p.s.i.g. Max. | Extrusion Temp., °C. | Extrusion rating |
|---|---|---|---|---|---|
| 2 | 1,1,2-trichlorotrifluoroethane | 4,830 | 11,200 | (1) | 6 |
| 3 | 1,1-difluorotetrachloroethane | 6,550 | 10,200 | (1) | 2 |
| 4 | do | 3,220 | 10,550 | 80 | 2 |
| 5 | 1,1,1-trifluorotrichloroethane | 9,550 | 11,300 | (1) | 5 |
| 6 | 44 wt. percent Pentachlorofluoroethane; 56 wt. percent 1,1,2-trichlorotrifluoroethane. | 2,070 | 3,910 | (1) | 7 |
| 7 | 26 wt. percent Pentachlorofluoroethane; 74 wt. percent 1,1,2-trichlorotrifluoroethane. | 13,350 | 18,050 | (1) | 6 |
| 8 | 50 wt. percent Sym. Tetrachlorodifluoroethane; 50 wt. percent 1,1,1-trifluorotrichloroethane. | 8,400 | 17,700 | (1) | 6 |
| 9 | 51 wt. percent 1,1-difluorotetrachloroethane; 49 wt. percent trifluorotrichloroethane. | 9,780 | 12,950 | (1) | 3 |
| 10 | 58 wt. percent 1,1,1-trifluorotrichloroethane; 30 wt. percent pentachlorofluoroethane; 12 wt. percent 1,1,2-trichlorotrifluoroethane. | 12,200 | 19,500 | (1) | 3 |
| 11 | Pentachlorofluoroethane | 8,250 | 10,650 | (1) | 6 |

[1] Room temperature.

EXAMPLES 12 to 17

These examples illustrate the relationship between lubricant concentration and extrusion temperature.

The granular PTFE powder used in these examples had a mean particle size of between 25μ and 35μ, and the extrusion compositions contained various amounts of sym.-tetrachlorodifluoroethane. These extrusion compositions were extruded at a reduction ratio of 40:1 using a ram travel of 1 in./min. at various extrusion temperatures using the extruder described in Example 1. Lubricant concentrations, extrusion pressures, extrusion temperatures, and extrusion ratings are listed below in Table II.

TABLE II

| Example | Weight Percent Sym.—Tetrachlorodifluoroethane in Extrusion Composition | Extrusion Pressure, p.s.i.g. Min. | Extrusion Pressure, p.s.i.g. Max. | Extrusion Temp., °C. | Extrusion Rating |
|---|---|---|---|---|---|
| 12 | 18 | 8,000 | 9,500 | (2) | 3 |
| 13 | 17 | 8,280 | 11,050 | (2) | 3 |
| 14 | 18 | 2,760 | 4,330 | 50 | 3 |
| 15 | 17 | 8,050 | 8,420 | 50 | 3 |
| 16 | 16 | 7,350 | 9,010 | 80 | 2 |
| 17 | 14 | 8,630 | 10,010 | 80 | 2 |
| 18 | 5 | (1) | 27,300 | 80 | 8 |
| 19 | 25 | 2,580 | 4,950 | (2) | 3 |

[1] Maximum.
[2] Room temperature.

EXAMPLES 20–24

The granular PTFE powder used in these examples had a mean particle size between 25μ to 35μ, the extrusion compositions contained various amounts of lubricant, and these compositions were extruded at a reduction ratio of 200:1 using a ram travel of 1 in./min. at various extrusion temperatures, using the extruder described in Example 1. Lubricants, lubricant concentrations, extrusion pressures and temperatures, and extrusion ratings are listed below in Table III.

sion apparatus described in Example 1, there is obtained a continuous highly fibrillated extrudate.

EXAMPLE 31

When an extrusion composition comprising 50 percent by weight of granular PTFE having a mean particle size of between $25\mu$ and $35\mu$, and 50 percent by weight of sym.-

TABLE III

| Example | Lubricant | Weight Percent Lubricant in Extrusion Composition | Extrusion Pressure, p.s.i.g. | | Extrusion Temp., °C. | Extrusion Rating |
|---|---|---|---|---|---|---|
| | | | Min. | Max. | | |
| 20 | 1,1,1-trifluorotrichloroethane | 19 | (¹) | 27,300 | (²) | 8 |
| 21 | Sym.-Tetrachlorodifluoroethane | 23 | 8,640 | 13,800 | (²) | 10 |
| 22 | do | 19 | 4,970 | 8,400 | (²) | 4 |
| 23 | do | 15 | 8,510 | 18,200 | 80 | 9 |
| 24 | do | 10 | (¹) | 27,300 | 80 | 4 |

¹ Maximum.
² Room temperature.

EXAMPLES 25–29

The lubricant used in these examples was sym. tetrachlorodifluoroethane and the extrusion temperature was room temperature. Extrusion compositions, extrusion conditions, and results of the extrusion are listed below in Table IV. The extruder used was that described in Example 1. The PTFE granular powder having a $5\mu$ mean particle size used in Example 28 was obtained by airmilling "Halon G–80" in a "Jet-O-Mizer" (T.M.) airmill. The PTFE granular powder having a mean particle size of $150$–$200\mu$ used in Example 29 was obtained by airmilling "Halon G–50" in a "Jet-O-Mizer" airmill. "Halon G–50" is a commercially available PTFE granular powder having a mean particle size of about $350\mu$.

tetrachlorodifluoroethane is extruded at room temperature at a reduction ratio of 40:1 and a ram travel of 1 in. per minute in the extrusion apparatus described in Example 1, there is obtained a continuous extrudate. A small amount of the lubricant is squeezed out of the extrusion composition during the extrusion process.

EXAMPLES 32–72

Examples 32 to 72 are given to illustrate the criticality of the choice of the lubricant in the process of the present invention. Various extrusion compositions employing a number of different organic compounds were prepared and extruded in the manner described in, and using the extruder used for, Example 1.

In these examples the PTFE granular powder had a

TABLE IV

| Example | Mean Particle Size of PTFE Resin, $\mu$ | Weight Percent Lubricant in Extrusion Composition | Reduction Ratio | Ram Travel, in./min. | Extrusion Pressure, p.s.i.g. | | Extrusion Rating |
|---|---|---|---|---|---|---|---|
| | | | | | Max. | Min. | |
| 25 | 25–35 | 20 | ¹72:1 | 1 | 13,900 | 11,750 | (²) |
| 26 | 25–35 | 19 | 40:1 | 2 | 10,080 | 8,280 | 4 |
| 27 | 25–35 | 19 | 40:1 | ½ | 7,950 | 6,900 | 4 |
| 28 | 5 | 19 | 40:1 | 1 | 10,800 | 8,270 | 3 |
| 29 | 150–200 | 19 | 40:1 | 1 | 11,100 | 9,250 | 4 |

¹ Tape die.
² Continuous tape, puckered, ragged edges.

EXAMPLE 30

When an extrusion composition comprising 81 percent by weight of a granular copolymer of PTFE with hexafluoropropylene, having a mean particle size of between 25 and $35\mu$, which copolymer contains about 5 percent by weight of hexafluoropropylene, and 19 percent by weight of 1,1,1-trifluorotrichloroethane is extruded at room temperature at a reduction ratio of 40:1 and a ram travel of 1 in. per minute in the manner of in the extrumean particle size between $25\mu$ and $35\mu$, the lubricant comprised 19 percent of the combined weight of the resin and lubricant, the reduction ratio was 40:1, the ram travel was 1 in./min., and the extrusion temperature was room temperature. Extrusion compositions, extrusion pressures, and results are listed in Table V below. It should be noted that in these examples the lubricant is squeezed out of the extrusion mixtures during the extrusion process, in contrast to the embodiments of the present invention, in which the lubricant is not squeezed out of the extrusion mixture during the extrusion process.

TABLE V

| Example | Lubricant | Extrusion Pressure, p.s.i.g. Min. | Extrusion Pressure, p.s.i.g. Max. | Extrusion Rating | Remarks |
|---|---|---|---|---|---|
| 32 | 1,1-dibromotetrafluoroethane | 5,170 | 7,500 | 10 | |
| 33 | Trichloromonofluoromethane | | | 10 | Could not be extruded at pressures below 27,300 p.s.i.g. |
| 34 | o-Dichlorobenzene | 3,910 | 5,700 | 10 | Lubricant squeezed out. |
| 35 | 3,3-difluorotetrachloropropene-1 | | | 10 | Do. |
| 36 | 1,2-dibromoethane | 6,550 | 8,210 | 10 | Do. |
| 37 | Bromoform | 6,900 | 8,950 | 10 | Do. |
| 38 | 1,2-dibromopropane | 5,880 | 7,350 | 10 | Do. |
| 39 | Trichloroethane | 2,830 | 5,130 | 10 | Do. |
| 40 | Methylene Chloride | 4,400 | 6,450 | 10 | Do. |
| 41 | Carbon Disulfide | 2,640 | 6,240 | 10 | Some lubricant squeezed out. |
| 42 | Trichloroethylene | 4,150 | 5,160 | 10 | Much lubricant squeezed out. |
| 43 | Pentachloroethane | 3,450 | 6,270 | 10 | Extrudate very soft, discontinuous, lubricant squeezed out. |
| 44 | 1,1,2-trichloroethane | 3,450 | 5,660 | 10 | Much lubricant squeezed out. |
| 45 | Trichlorofluoromethane | 3,790 | 18,750 | 10 | Do. |
| 46 | Hexachloroacetone | 2,990 | 8,960 | 10 | Do. |
| 47 | Perchloroethylene | 3,750 | 6,240 | 10 | Do. |
| 48 | Lauryl Alcohol | 484 | 1,580 | 10 | Some lubricant squeezed out. |
| 49 | 78 percent 1,1,1-trichlorotrifluoroethane; 22 percent trichloromethane | 3,220 | 5,470 | 10 | Do. |
| 50 | 40 percent 1,1,2-trichlorotrifluoroethane; 51 percent Methylene Chloride; 9 percent Methyl Alcohol. | 3,340 | 5,300 | 10 | Much lubricant squeezed out. |
| 51 | Hexachlorocyclopentadiene | 3,290 | 5,800 | 10 | Do. |
| 52 | 1,2-dichloroethane | 3,960 | 6,670 | 10 | Very much lubricant squeezed out. |
| 53 | "Deo-Base" (T.M.) | 1,265 | 2,300 | 10 | Do. |
| 54 | 1,1-difluoro-3-hydropentafluoropropane | 2,640 | 4,760 | 10 | Much lubricant squeezed out. |
| 55 | Sym. Dichlorotetrafluoroacetone | 3,270 | 7,640 | 10 | Do. |
| 56 | Sym. Difluorotetrachloroacetone | 2,760 | 5,520 | 10 | Some lubricant squeezed out. |
| 57 | Pentachloropropane | 4,600 | 6,440 | 10 | Much lubricant squeezed out. |
| 58 | 1,2,3-trichloropropane | 3,610 | 6,150 | 10 | Do. |
| 59 | 1,1,1-trifluorotrichloroacetone | 2,760 | 5,290 | 10 | Do. |
| 60 | Perfluorokerosene (high boiling) | 3,760 | 12,650 | 10 | Little lubricant squeezed out. |
| 61 | Hexachloro-2-cyclopentenone | 3,130 | 5,060 | 10 | Some lubricant squeezed out. |
| 62 | 1-chlorododecane | 1,195 | 1,220 | 10 | Much lubricant squeezed out. |
| 63 | n-Hexane | 2,990 | 4,320 | 10 | Do. |
| 64 | Glycerin | 2,640 | 3,100 | 10 | Some lubricant squeezed out. |
| 65 | Silicon Oil G.E. SR 704 | 2,760 | 4,414 | 10 | Very much lubricant squeezed out. |
| 66 | 1,1,2-trichloropentafluoropropane | 3,450 | 5,640 | 10 | Little lubricant squeezed out. |
| 67 | n-Decane | 2,650 | 4,600 | 10 | Very much lubricant squeezed out. |
| 68 | Acrylonitrile | 6,000 | 8,630 | 10 | Do. |
| 69 | Isooctane | 3,450 | 5,750 | 10 | Do. |
| 70 | 1,2,3-trichloropentafluoropropane | 2,990 | 5,330 | 10 | Do. |
| 71 | 1,2-dichlorohexafluorocyclopentane | 2,880 | 4,760 | 10 | Much lubricant squeezed out. |
| 72 | 2,3,3-trichloroheptafluoroethane | 2,760 | 7,370 | 10 | Extrudate discontinuous insections, badly frayed. |

The extrusion compositions of this invention may also comprise inert fillers such as asbestos, glass, metal powders, graphite, coke flour, pigments, and the like in an amount of up to about 30 percent by volume, preferably up to about 20 percent by volume, based on the combined volume of granular resin and inert filler. Fillers may be incorporated to improve such properties as resistance to creeping under load, resistance to wear by rotating shafts, stiffness, thermal conductivity, and hardness, as well as for a variety of other purposes, as for example for pigmentation, lubrication, and cost reduction. The fillers are preferably intimately blended with the granular resin prior to lubrication and extrusion to obtain a uniform distribution of the filler in the resin. The filler-granular PTFE resin bland is then admixed with the lubricant, and is extruded, in the manner described hereinabove.

Examples 73–75 illustrate the extrusion of lubricated filler compositions in accordance with the present invention.

EXAMPLE 73

To 80 grams of granular PTFE having a mean particle size of between about $25\mu$ and about $35\mu$ contained in a wide-necked jar were added 20 grams of Owens Corning No. 709 Fiberglas, the fibers of which had a mean length of about 3/32 in. The mixture was hand tumbled to blend the components. To the mixture so blended were added 25 grams of sym.-difluorotetrachloroethane, and the mixture was hand tumbled to blend solid and liquid components. The blended lubricated filled extrusion composition was then hand compacted in a cylindrical tube having a 1¼ in. inner diameter to form a cylindrical billet. The billet so formed was extruded in the manner of and in the extruder described in Example 1. Extrusion pressures varied between 15,000 p.s.i.g. and 20,000 p.s.i.g. The extrudate so obtained had an extrusion rating, as hereinabove defined, of about 4. No lubricant was squeezed out of the extrusion mixture during the extrusion process.

The extrudate so obtained was air dried and milled in a laboratory hammermill to obtain a fluffy fibrous product comprised of particulate fibers having a length predominantly between about ½ in. and 1½ in., and a length to diameter ratio of between about 10:1 and about 15:1.

EXAMPLE 74

Example 73 was repeated using the same raw materials, but employing an extrusion composition comprised of 72 percent by weight of granular PTFE, 8 percent by weight of Fiberglas, and 20 percent by weight of lubricant. Extrusion pressures varied between 10,000 p.s.i.g. and 15,000 p.s.i.g. The extrudate had an extrusion rating of about 4.

EXAMPLE 75

Example 73 was repeated using the same granular PTFE and lubricant, but using a bronze powder, Metals Disintegrating Co. No. 101 Bronze Powder, as filler. The extrusion composition was comprised of 56 percent by weight of granular PTFE, 24 percent by weight of the bronze powder, and 20 percent by weight of the lubricant. Extrusion pressures varied between 15,000 p.s.i.g. and 20,000 p.s.i.g. The extrudate had an extrusion rating of about 5.

The extrudate so obtained was air dried and milled in a laboratory hammermill to obtain a fluffy fibrous product comprised of fibers having a length predominantly between about ½ in. and 1½ in., and a length to diameter ratio of between about 10:1 and about 15:1.

Various embodiments, changes and modifications will be apparent, from the foregoing description and examples, to those skilled in the art. All such embodiments that fall within the true spirit of the invention are intended to be included with the invention limited only as set forth in the appended claims.

We claim:
1. Extrusion compositions comprising a finely divided granular resin selected from the group consisting of granular polytetrafluoroethylene, granular copolymers of tetrafluoroethylene with hexafluoropropylene containing between about 0.5 per cent and about 10 percent by weight of hexafluoropropylene, granular copolymers of tetrafluoroethylene with chlorotrifluoroethylene containing between about 0.5 percent and about 10 percent by weight of chlorotrifluoroethylene, and mixtures thereof, admixed with an effective amount of a lubricant selected from the group consisting of perhalogenated ethanes containing only fluorine and chlorine atoms as halogen, and containing at least one, but not more than three fluorine atoms, and mixtures thereof, wherein the lubricant comprises between about 5 percent and about 50 percent of the combined weight of the finely divided granular resin and the lubricant.

2. Extrusion compositions of claim 1 wherein the finely divided granular resin has a mean particle size below about 50µ, wherein the lubricant is selected from the group consisting of pentachloromonofluoroethane, 1,2-difluoroeterachloroethane, 1,1,1-trifluorotrichloroethane, and mixtures thereof, and wherein the lubricant comprises between about 5 percent and about 25 percent of the combined weight of the finely divided granular resin and the lubricant.

3. Extrusion compositions of claim 1, wherein the finely divided granular resin is finely divided granular polytetrafluoroethylene.

4. Extrusion compositions of claim 3 wherein the lubricant is selected from the group consisting of pentachloromonofluoroethane, 1,2-difluorotetrachloroethane, 1,1,1-trifluorotrichloroethane, and mixtures thereof.

5. Extrusion compositions of claim 3 wherein the lubricant is pentachloromonofluoroethane.

6. Extrusion compositions of claim 3 wherein the lubricant is 1,2-difluorotetrachloroethane.

7. Extrusion compositions of claim 3 wherein the lubricant is 1,1,1-trifluorotrichloroethane.

8. Extrusion compositions of claim 3 wherein the lubricant comprises between about 5 percent and about 25 percent of the combined weight of the finely divided granular polytetrafluoroethylene and the lubricant.

9. Extrusion compositions of claim 3 wherein the finely divided granular polytetrafluoroethylene has a mean particle size below about 50µ.

10. Extrusion compositions of claim 4 wherein the finely divided granular polytetrafluoroethylene has a mean particle size below about 50µ.

11. Extrusion compositions of claim 4 wherein the lubricant comprises between about 5 percent and 25 percent of the combined weight of the finely divided granular polytetrafluoroethylene and the lubricant.

12. Extrusion compositions of claim 10 wherein the lubricant comprises between about 5 percent and 25 percent of the combined weight of the finely divided granular polytetrafluoroethylene and the lubricant.

13. Extrusion compositions of claim 12 wherein the lubricant is pentachloromonofluoroethane.

14. Extrusion compositions of claim 12 wherein the lubricant is 1,2-difluorotetrachloroethane.

15. Extrusion compositions of claim 12 wherein the lubricant is 1,1,1-trifluorotrichloroethane.

16. Extrusion compositions of claim 1 comprising up to about 20 percent by volume of an inert filler, based on the combined volume of the finely divided granular resin and the inert filler.

17. Extrusion compositions of claim 3 comprising up to about 20 percent by volume of an inert filler, based on the combined volume of the finely divided granular polytetrafluoroethylene and the inert filler.

18. A process for extruding extrusion compositions according to claim 1 which comprises mixing a finely divided granular resin selected from the group consisting of granular polytetrafluoroethylene, granular copolymers of tetrafluoroethylene with hexafluoropropylene containing between about 0.5 percent and about 10 percent by weight of hexafluoropropylene, granular copolymers of tetrafluoroethylene with chlorotrifluoroethylene containing between about 0.5 percent and about 10 percent by weight of chlorotrifluoroethylene, and mixtures thereof, with an effective amount of a lubricant selected from the group consisting of perhalogenated ethanes containing only fluorine and chlorine atoms as halogen, and containing at least one, but not more than three fluorine atoms, and mixtures thereof, and extruding the resulting mixture.

19. A process for extruding extrusion compositions according to claim 3 which comprises mixing finely divided granular polytetrafluoroethylene with an effective amount of a lubricant selected from the group consisting of perhalogenated ethanes containing only fluorine and chlorine atoms as halogen, and containing at least one, but not more than three fluorine atoms, and mixtures thereof, and extruding the resulting mixture.

20. The process of claim 19 wherein the finely divided granular polytetrafluoroethylene has a mean particle size below about 50µ, and wherein the lubricant is employed in an amount of from about 5 percent to about 25 percent of the combined weight of the finely divided granular polytetrafluoroethylene and the lubricant.

21. The process of claim 20 wherein the mixture comprising the lubricant and the finely divided granular polytetrafluoroethylene is extruded at a temperature between about 10° C. and about 150° C.

22. The process of claim 19 wherein the lubricant is selected from the group consisting of pentachloromonofluoroethane, 1,2-difluorotetrachloroethane, and 1,1,1-trifluorotrichloroethane, and mixtures thereof.

23. The process of claim 19 wherein the lubricant is pentachloromonofluoroethane.

24. The process of claim 19 wherein the lubricant is 1,2-difluorotetrachloroethane.

25. The process of claim 19 wherein the lubricant is 1,1,1-trifluorotrichloroethane.

26. A process for extruding extrusion compositions according to claim 17 which comprises mixing finely divided granular polytetrafluoroethylene and inert filler with an effective amount of a lubricant selected from the group consisting of perhalogenated ethanes containing only fluorine and chlorine atoms as halogen and containing at least one, but not more than three fluorine atoms, and mixtures thereof and extruding the resulting mixture.

27. A process for the production of particulate polytetrafluoroethylene fibers having a length of between about 50µ and about 2 inches, and a length to diameter ratio between about 10:1 and about 15:1, which comprises mixing finely divided granular polytetrafluoroethylene with between about 5 percent to about 25 percent by weight of a lubricant selected from the group consisting of perhalogenated ethanes containing only fluorine and chlorine atoms as halogen, and containing at least one, but not more than three fluorine atoms, and mixtures thereof, extruding the resulting mixture at a reduction ratio of from about 5:1 to about 200:1, and milling the resulting extrudate to obtain particulate fibers.

28. The process of claim 27 wherein the lubricant is selected from the group consisting of pentachloromonofluoroethane, 1,2-difluorotetrachloroethane, 1,1,1-trichlorotrifluoroethane, and mixtures thereof.

29. A process for the production of particulate fibers comprising polytetrafluoroethylene and inert filler in amount of up to about 20 percent of the combined volume of polytetrafluoroethylene and inert filler, said fibers having a length of between about 50µ and about 2 inches, and a length to diameter ratio of between about 10:1 and about 15:1, which comprises (1) mixing (a) finely divided granular polytetrafluoroethylene, (b) inert filler in an amount of up to about 20 percent of the combined volume of polytetrafluoroethylene and inert filler, and (c) a lubricant selected from the group consisting of perhalogenated ethanes containing only fluorine and chlorine atoms as halogen, and containing at least one, but not more than three fluorine atoms, and mixtures thereof, in an amount of between about 5 percent and about 25 percent of the combined weight of polytetrafluoroethylene, filler, and lubricant, (2) extruding the resulting mixture at a reduction ratio of from about 5:1 to about 200:1, and (3) milling the resulting extrudate to obtain particulate fibers.

30. The process of claim 29 wherein the lubricant is selected from the group consisting of pentachloromonofluoroethane, 1,2 - difluorotetrachloroethane, 1,1,1-trichlorotrifluoroethane, and mixtures thereof.

References Cited

UNITED STATES PATENTS 2,630,417  3/1953  Lontz.
3,072,583  1/1963  Randa.

MORRIS LIEBMAN, *Primary Examiner.*

L. T. JACOBS, *Assistant Examiner.*